(12) United States Patent
Hagenbuch

(10) Patent No.: US 8,596,705 B2
(45) Date of Patent: Dec. 3, 2013

(54) HYDROPHOBIC AND OLEOPHOBIC COATINGS ON TRUCKS

(76) Inventor: LeRoy G. Hagenbuch, Peoria Heights, IL (US)

( * ) Notice: Subject to any disclaimer, the term of this patent is extended or adjusted under 35 U.S.C. 154(b) by 0 days.

(21) Appl. No.: 13/532,662

(22) Filed: Jun. 25, 2012

(65) Prior Publication Data
US 2012/0326463 A1 Dec. 27, 2012

Related U.S. Application Data

(60) Provisional application No. 61/501,071, filed on Jun. 24, 2011.

(51) Int. Cl.
*B60R 13/01* (2006.01)

(52) U.S. Cl.
USPC ........................ 296/39.1; 296/183.1

(58) Field of Classification Search
USPC ............. 296/39.1, 39.2, 183.1, 183.2
See application file for complete search history.

(56) References Cited

U.S. PATENT DOCUMENTS

| | | | |
|---|---|---|---|
| 4,995,773 A * | 2/1991 | Lamoureux et al. | 414/489 |
| 7,723,410 B2 | 5/2010 | Daly et al. | |
| 2008/0250978 A1 | 10/2008 | Baumgart et al. | |
| 2010/0314575 A1 | 12/2010 | Gao et al. | |
| 2010/0316842 A1 * | 12/2010 | Tuteja et al. | 428/143 |

OTHER PUBLICATIONS

International Search Report from co-pending International Application No. PCT/US2012/044086 dated Sep. 13, 2012.
Page 26 from 789C Mining Specification, "Optional Equipment", Weight/Payload Calculation, retrieved from caterpillar.com/ downloadable Product Brochures, 789C Mining Truck Caterpillar, Inc. May 2011 (1 page).
Page 31 from 793D Mining Specification, "Optional Equipment", Weight/Payload Calculation, retrieved from caterpillar.com/ downloadable Product Brochures, 793D Mining Truck Caterpillar, Inc. May 2011 (1 page).
Caterpillar 797 Truck, after cleaning ready for maintenance, Photograph taken of the CAT 797B taken at a Canadian Oil Sands Mine Maintenance Facility on Aug. 10, 2010.(1 page).
NeverWet, "Application Guide for NeverWet™ NuO Coat", Ross Nantechnology, LLC, Ross Nanotechnology LLC, May 24, 2011 (2 pages).
NeverWet, "NeverWetTM NuO-Coat", Ross Nantechnology, LLC, Ross Nanotechnology LLC, May 24, 2011 (4 pages).
Crodon Wear Plate, "The Leading Solution for Optimal Flow of Abrasive Bulk Materials", Chromium Corporation, Oct. 21, 2009. (2 pages).
Crodon Wear Plate, Tough Slick, "Harness Measures" Chromium Corporation, Oct. 21, 2009 (1 page).
Article entitled, "Information on Contact Angle" retrieved from http://www.ramehart.com/contactangle.htm on Jun. 8, 2011(4 pages).

* cited by examiner

*Primary Examiner* — Jason S Morrow
*Assistant Examiner* — E Turner Hicks
(74) *Attorney, Agent, or Firm* — Leydig, Voit & Mayer, Ltd.

(57) ABSTRACT

An apparatus and method is provided for truck bodies to minimize the debris buildup that often occurs on and in truck bodies. Hydrophobic and oleophobic materials are used to coat and protect truck bodies so as to facilitate the release of debris that otherwise might stick to a truck body. If left unchecked, such debris has the net effect of reducing the allowable payload that a truck can effectively carry. Additionally if truck body debris builds up, if not prevented, whenever maintenance work must occur on a truck, for safety reasons any debris buildup on a truck body must be removed prior to any maintenance being performed to preclude any of this debris from falling on maintenance personnel and/or hampering such maintenance.

13 Claims, 19 Drawing Sheets

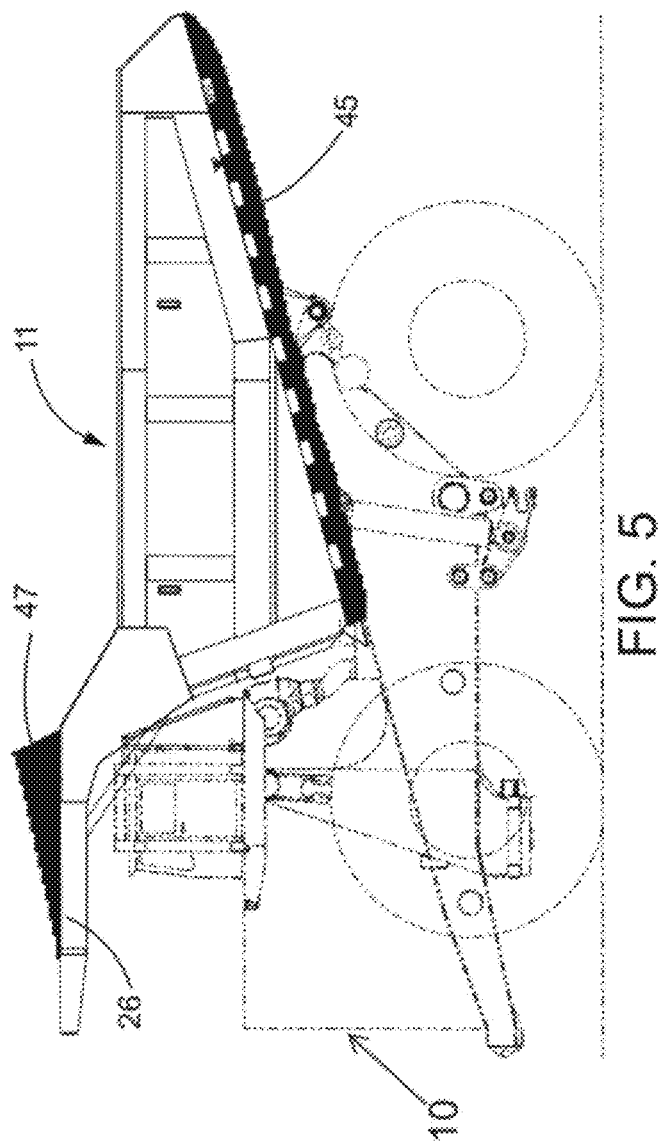
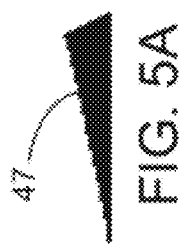

HYDROPHOBIC AND OLEOPHOBIC COATINGS ON TRUCKS

CROSS-REFERENCE TO RELATED APPLICATION

This patent application claims the benefit of U.S. Provisional Patent Application No. 61/501,071, filed Jun. 24, 2011, which is incorporated by reference.

TECHNICAL FIELD

The invention generally relates to trucks which may have payload carrying capacities of 400 tons or more and particularly to bodies for on-highway and off-highway trucks, which on larger trucks can easily be thirty (30) feet wide, fifty (50) feet long and twelve (12) feet deep. Of this fifty (50) foot body length, as much as twelve (12) feet may be the body canopy, over the truck operator's cab. Accordingly, there is a very large under surface and canopy surface on such trucks. This invention relates to the use of various coatings and coated materials on these trucks to minimize any road debris buildup on the truck chassis and body exterior and/or hauled material debris buildup in the truck bodies.

BACKGROUND

Today, off-highway trucks with carrying capacities from as low as twenty five (25) to four hundred (400) tons or more are used in a number of off road environments for hauling a variety of materials. As the "off-highway" name implies, use of these trucks is limited to off-highway, private roads such as in quarries, landfills, mines, steel mills, power plants. As such the typical norm is for these off-highway trucks to operate on unpaved gravel/aggregate roads ("haul roads"). One of the significant challenges of operating off-highway trucks on these private gravel/aggregate roads is the dust that can be created as the trucks travel back and forth between destinations. The dust created as the off-highway trucks travel on these unpaved roads causes both an environmental problem and a safety (visibility) problem.

This off-highway road dust necessitates spreading dust suppressant on the off-highway truck haul roads. This dust suppressant normally takes the form of water sprayed on the haul roads by large water truck tankers. Although the haul road water suppresses the dust, it unfortunately at the same time often causes the haul roads to become muddy. One large Western United States mine reports that on hot summer days they have to spread almost three million (3,000,0000) gallons of dust suppressant water a day on their off-highway truck haul roads. When spreading this much water, it is inevitable that some areas on the haul roads are overwatered and, accordingly, exceptionally muddy for some period of time until the water is absorbed into the ground or evaporates.

Mines often have off-highway truck fleets of as many as fifty (50) to one hundred (100) off-highway trucks. A typical off-highway truck fleet might consist of two hundred fifty (250) ton capacity off-highway trucks, each of which cost upwards of $2,750,000.00 USD to $3,500,000.00 USD. Accordingly, a mine's capital investment in off-highway truck fleets and the ancillary equipment needed to support such a fleet typically necessitates operating such fleets twenty four (24) hours a day, three hundred sixty (360) plus days a year. And, when operating around the clock, a mines environmental conditions are often challenging—e.g., rain, snow, sleet and the like—which also impacts haul road conditions, creating poor haul road conditions that include slippery, muddy haul roads.

Muddy, poor haul road conditions result in mud being thrown up by the off-highway truck's tires. This mud invariably sticks to the off-highway truck chassis/body underside. One can appreciate that on some days it is first dust collecting on the underside of an off-highway truck chassis/body, then wet sticky mud, then more dust, etc., through an endlessly repeated cycle. And as this road 'debris' is thrown up onto the underside of the body by the off-highway truck tires, the movement of the off-highway truck causes air flow that dries the mud enough so even more mud sticks to what is already stuck to the off-highway truck body. This layering or build up process is something like making adobe bricks, resulting in a thick layer of caked-on, mud.

In freezing environs this build up of mud is even worse. As wet road 'debris' is thrown up from the tires it further sticks to the underside of an off-highway truck chassis/body both by the natural cohesiveness of the road 'debris' and the stickiness resulting from the freezing nature of this 'debris' when it mixes with snow fall, rain, etc. No matter the time of the year or environmental conditions, road 'debris' that collects on a haulage vehicle is detrimental to the hauling capabilities of a truck.

The payload hauling capacity of an off-highway truck is determined as follows:

$$\text{Maximum Gross Vehicle Weight} - \text{Net Vehicle Weight} \text{ (i.e., empty vehicle weight)} = \text{Full Payload}, \quad (1)$$

where Maximum Gross Vehicle Weight is the weight that an off-highway truck is rated to safely carry, which is typically limited by tire capacity. However, any 'debris' that is carried on the outside of an off-highway truck body or truck chassis, as thrown up by the truck tires, etc. also needs to be factored into the "Net Vehicle Weight."

One prominent off-highway truck manufacturer has established a four (4) percent of 'clean' Net Vehicle Weight 'debris' benchmark allowance, and increases Net Vehicle Weight by this factor to arrive at a "Factored Net Vehicle Weight" in the above formula—i.e., 1.04 times Net Vehicle Weight=Factored Net Vehicle Weight.

Typical 250 ton capacity off-highway trucks have a 'clean' Net Vehicle Weight of 250,000 pounds so the 'debris' allowance would be (250,000×0.04=10,000 pounds) or five (5) tons of Lost Payload capabilities. Likewise a 400 ton capacity off-highway truck having a 'clean' Net Vehicle Weight of 475,000 pounds would have a 'debris' allowance or payload reduction of 19,000 pounds or nine and one half (9.5) tons Lost Payload.

Replacing the "Net Vehicle Weight" in the Full Payload equation (1) above with the updated "Factored Net Vehicle Weight" gives a "Factored" or "Achievable" Payload.

$$\text{Maximum Gross Vehicle Weight} - \text{"Factored Net Vehicle Weight"} \text{ (i.e., empty vehicle weight)} = \text{Factored or Achievable Payload}, \quad (2)$$

which is 98% of the Full Payload, assuming the 4% example referenced above for the amount of debris carried on the vehicle. As suggested by the examples given above, the 4% debris factor is a significant amount of material for these large capacity trucks and when summed over many haul cycles reflects a significant reduction in the hauling efficiency of the trucks.

On a large off-highway truck with a "rated" payload of four hundred (400) tons the actual "effective" payload could really be nine and a half (9.5) tons of outside 'debris' and possibly, if off-highway truck body inside material carryback is also occurring an additional twelve (12) tons of body inside 'carryback' could exist for a total of twenty one and one half (21.5) tons of outside body 'debris' and inside body material carryback. Thus, the off-highway truck which was purchased as a four hundred (400) ton off-highway truck is in reality about a three hundred eighty (380) ton or less truck. That's a four (4) percent loss in carrying capacity. If an off-highway truck costs $12,000.00 to $16,000,00 USD per ton of hauling capacity, this nine and one half (9.5) tons of 'debris' converts to a $240,000.00 to $320,000.00 payload carrying loss per truck.

Thus, the elimination of truck 'debris' and truck 'carryback' is economically very important and very cost effective as well as being operationally safety driven.

Payload capacity for on-highway trucks is similarly compromised by debris. Payload carrying capacity of on-highway trucks is more typically set by State Gross Vehicle Weight Regulations. Various State Departments of Transportation on a state-by-state basis establish maximum road Gross Vehicle Weights. These maximum Gross Vehicle Weights vary from road type to road type; Interstate Roads, Primary State Roads, Secondary Roads, etc. And further in some states at various times of the year there are "frost laws" that reduce the maximum value of the Gross Vehicle Weight.

On-highway trucks often have the carrying capacity to haul significantly more Gross Vehicle Weight than is typically allowed by most state's Departments of Transportation. Accordingly, if a particular on-highway truck load is indivisible, then special permits are typically available to permit the movement of such loads with higher Gross Vehicle Weights. But such permits are typically only issued when the load is indivisible. In all other situations, any debris on/in an on-highway truck immediately and directly adds to the on-highway trucks Gross Vehicle Weight and subtracts from the maximum allowable payload capacity of the truck.

Just like debris retained on off-road trucks, debris retained on on-highway trucks, results in reduce payload capacity and Lost Payload.

SUMMARY

Five terms are important to in explaining the issue of collected "debris": hydrophilic, hydrophobic, super-hydrophobic, oleophobic and super-oleophobic.

Hydrophilic refers to a surface such as ordinary steel/painted steel that water will spread over without forming any water droplets, A typical steel condition.

Hydrophobic refers to a surface that when water is dropped on it water beads are formed. The degree of hydrophobicity is a relative term thus hydrophobic and super-hydrophobic.

Hydrophobic—Surfaces with water contact angles greater than 90° are called hydrophobic.

Super Hydrophobic—Surfaces with water contact angles greater than 150° are called super-hydrophobic.

Thus, the degree to which water beads form on a surface defines whether a surface is hydrophobic or super-hydrophobic.

Just as water can be repelled by hydrophobic materials so can oil and like petroleum products be repelled by oleophobic and super-oleophobic materials.

Oleophobic—Are surfaces with oil contact angles greater than 90°

Super Oleophobic—Are surfaces with oil contact angles greater than 150°.

Hydrophobic materials can either be supplied as steel plate to which a "special chromium" material has been applied or as a paint. In this state, the hydrophobic material is 0.020 inches thick and is very abrasion resistant, with a Mohs Number of 9 (iron is 4.5 and diamond is 10).

Hydrophobic materials can also be supplied in a liquid form and painted onto a surface. In this state the material is several "mils" thick and is typically a super-hydrophobic material. Advantages of the painted hydrophobic materials are that they can be applied to existing items and irregular shaped items are that can be easily coated.

Oleophobic materials are also supplied in a liquid form for painting onto a surface. In this state the material is several "mils" thick; and, is typically a Super-Oleophobic material. Advantages of painted oleophobic materials are that they can be applied to existing items and as well as irregular shaped items are easily coated.

Although the painted hydrophobic and oleophobic materials have some resistance to abrasion they do not have the abrasion resistance that steel backed hydrophobic material has.

Typical abrasion resistance of hydrophobic and oleophobic painted materials using the "Taber Abrasion Process" is 6000 cycles.

An object of the invention is to minimize the amount of 'debris' that collects on a truck while at the same time making it easier to clean of any 'debris' that might collect on a truck. With proper use of super-hydrophobic materials on a truck, most 'debris' can be prevented from collecting on a truck.

Another object of the invention is to minimize the amount of 'oily debris' that collects on a truck while at the same time making it easier to clean off any 'oily debris' that might collect on a truck. With proper use of super-oleophobic materials on a truck most 'oily debris' can be prevented from collecting on a truck.

Another object of the invention is to combine super-hydrophobic materials with super-oleophobic materials on a truck to minimize the collection of both watery and oily debris that sticks to a surface because of both a water-based and oil-based agent in the debris.

As trucks need to be maintained/worked on, it is an additional object of the invention to provide for any 'debris' or 'oily debris' that collects on a truck to be easily washed off due to the water repelling characteristics of hydrophobic materials and the petroleum repelling characteristics of oleophobic materials that are part of the truck and its haulage body.

Another object of the invention is to design truck bodies with fewer nooks and crannies in the underside of these truck bodies so that super-hydrophobic and super-oleophobic materials can more easily release the 'debris' or 'oily debris' that might attempt to stick to the truck body outside surfaces and underside.

Another object of the invention is to put hydrophobic materials and/or oleophobic materials on the top of the truck body canopy to preclude hauled material from sticking in any form onto this canopy area.

A further object of the invention is to further enhance the ability of the truck body to shed carryback (haulage material stuck to the interior of the body) by including load containment hydrophobic body plates (i.e., plates the load actually contacts) utilizing special hydrophobic treated steel plates as part of the body structure or special hydrophobic treated steel plates attached to the basic body load containment plates.

In one embodiment of the invention, a super-hydrophobic coating is applied to the underside of the truck body. By inhibiting the build up of debris on the underside of the body, the effective haulage capacity of the body is increased and maintenance of the body is made easier. In a further and alternative embodiment of the invention, hydrophobic material is added to the interior of the body so as to further increase the hauling capacity of the body by inhibiting the build up of haulage material 'carryback' in the body. In one embodiment, the hydrophobic material is added to selected areas of the interior such as corner areas that typically are associated with a build up of material during haulage.

BRIEF DESCRIPTION OF THE DRAWINGS

FIG. 5 is a side view of the off-highway truck of FIGS. 1 and 2 showing where major 'debris' can be expected to buildup on the truck body.

FIGS. 5A and 5B are isolated views of the major debris illustrated in FIG. 5, where FIG. 5A is the debris buildup on a canopy of the haulage body in FIGS. 5 and 5B is the debris buildup on the underside of the body in FIG. 5.

FIGS. 8A and 8B illustrate the two areas of the truck in FIG. 8 that include hydrophobic and/or oleophobic materials, where FIG. 8A is material for the canopy of the haulage body and FIG. 8B is material for the underside of the body.

DETAILED DESCRIPTION

Figure 1:
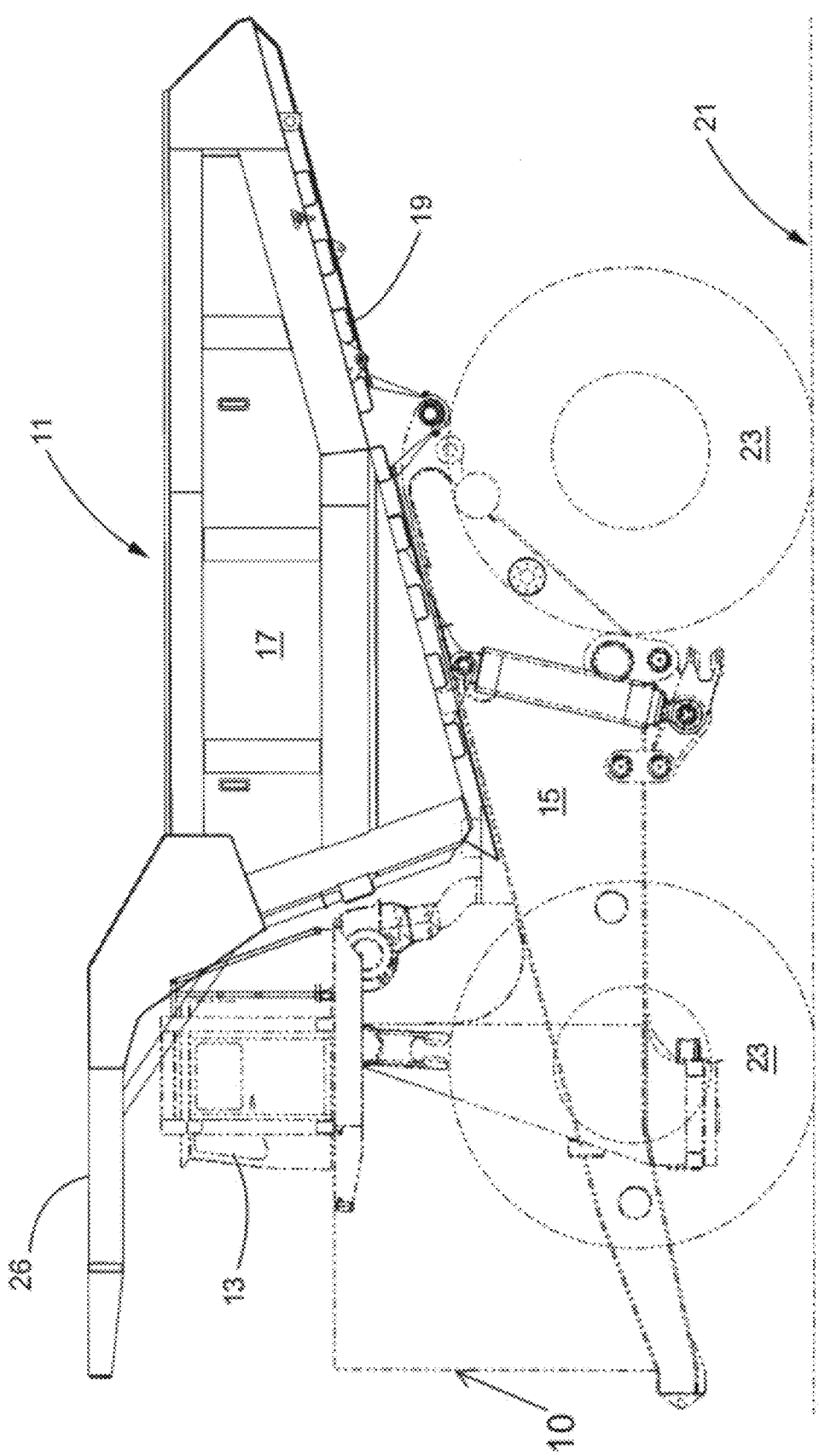
FIG. 1 is a side view of a typical off-highway truck.

'Debris' collecting on a truck both reduces the effective payload that a truck can carry and hampers performing effective truck maintenance.

The floors of truck bodies require substantial underpinnings to withstand the loads and loading impacts that truck bodies are subjected to on a daily basis. For example, off-highway truck body loads of four hundred (400) tons are often loaded in as little as four (4) to five (5) scoops of an electric rope shovel. As shovel bucket loads of approximately one hundred (100) tons are dropped onto a truck body floor, the body floor sub structure is severely impacted; thus the need for body floor underpinnings. To handle these loads, a truck body floor substructure is typically made up of longitudinal body frame rails and cross wise body floor channels. Each joint between one of the body cross floor channels and the body floor plate and the longitudinal body frame rails is a potential location where road 'debris' and the like can buildup.

In addition to loosing payload to 'debris' buildup, this truck 'debris' also causes problems related to truck maintenance. A typical maintenance interval for off-highway trucks is every two hundred and fifty (250) operating hours or five hundred (500) operating hours. For example, if there are twenty two (22) actual vehicle operating hours per day, then every twelve (12) days or twenty three (23) days, respectively, trucks are put through a preventative maintenance schedule. However, before preventive maintenance is performed on any truck, it must be cleaned off. There are two reasons for this: First, safety in working on a truck. Truck mechanics can not be exposed to chucks of 'debris' falling on them. Second, removal of 'debris' gives clear access to everything that must be serviced as part of the preventive maintenance. In large mining operations, 'wash hays' are often set up in buildings totally separate from the regular maintenance buildings for cleaning each truck prior to it being worked on either for preventive maintenance tasks or for more substantial maintenance repairs.

Not only does 'debris' collect on the outside of a truck body and truck chassis, additional material or 'carryback' can also accumulate inside a truck body. If the material being hauled by a truck is sticky (extremely cohesive) or if the trucks are operating in extremely cold, freezing environments, then loads hauled by the trucks may be not totally dumped from the bodies. Any material that fails to dump is generally referred to as 'carry back,' inferring that what should have been payload is literally being carried back to the truck loading point and is effectively part of the truck's new empty weight.

In some mining operations off-highway truck body carry back of ten (10) to fifteen (15) tons or more is not uncommon. Truck operators use various methods to minimize such truck carry back, but more often than not many operators simply look at this truck carry back as a necessary consequence of hauling material. And, just as carry back effects off-highway trucks it likewise effects on-highway trucking operations. And whether it is with an on-highway or off-highway truck such carry back must be subtracted from the total payload that a truck can carry. Twelve (12) tons of carry back simply means that the effective payload of an on/off-highway truck is reduced by twelve (12) tons or the net empty weight of the truck is increased by the twelve (12) tons.

Just as outside truck chassis/body 'debris' effects truck maintenance so does inside truck material carry back effect truck maintenance. Typically at some point in a truck's preventive maintenance the body of the truck is actuated to full dump. If there is any material carry back in the truck body the danger exists that this truck body material carry back may at any time partially or totally break free and slide out of the body. At the least, this creates a mess on the maintenance shop floor. And, at worst, the debris slides into and damages maintenance shop equipment, doors and/or injures personnel who at that instant just happen to be in the path of this falling/sliding material 'carryback'.

Thus, every prudent effort is made to dislodge this truck body material carry back prior to a truck being serviced for preventive maintenance, but these efforts often meet with limited success.

The Lotus "Cleaning" Effect

In keeping with the invention, a truck surface ideally would have the property of the "Lotus effect." The "Lotus effect" refers to the very high water repellency exhibited by Lotus flower leaves. As water droplets flow across Lotus flower leaves, the water droplets pick up dirt particles and literally wash the dirt particles away/off. This very high water repellency of Lotus flower leaves is known as super-hydrophobicity. The water repellent surface of a Lotus leaf enables both the contact area and the adhesive attraction between the Lotus leaf surface and a water droplet to be significantly reduced resulting in a repelling of the water and the Lotus leaf's self cleaning process. The degree of water repelling or hydrophobicity of a surface is determined by the contact angle of a water droplet to a surface. The higher the contact angle, the greater the hydrophobicity.

The Lotus effect also relates to cleaning dirt particles from a surface. Dirt particles typically have an extremely reduced contact angle with a surface compared to water. As a water droplet rolls across a contaminated surface, the adhesion or attraction between the dirt particle and the water droplet is higher than that between the dirt particle and the surface it is setting on. Water droplets literally roll over a water repellant (hydrophobic) surface much like a snow ball rolling downhill and dirt particles attach to the water droplet just like dirt attaches to a rolling snowball.

Figure 12:
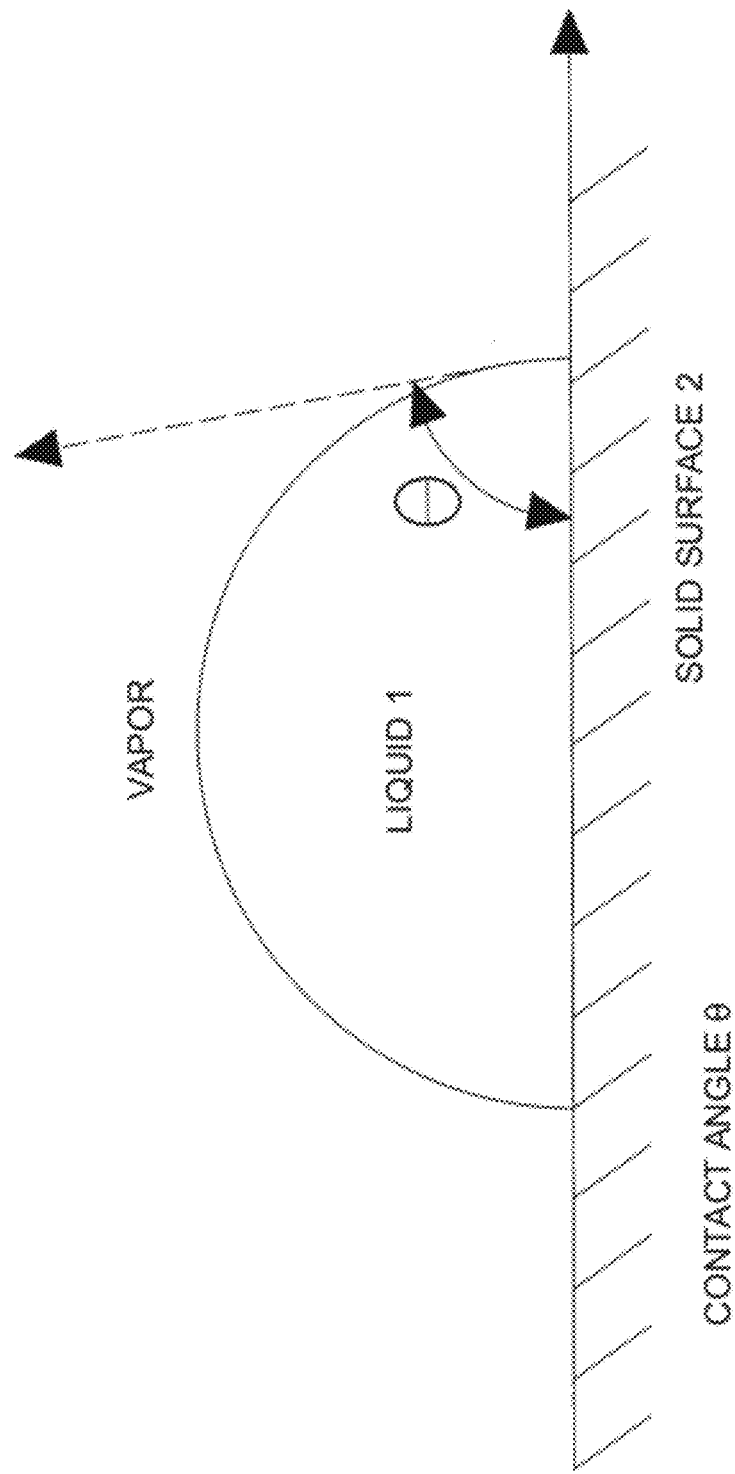
FIG. 12 is an illustration of a water or oil droplet showing the hydrophobic and oleophobic contact angles of the droplet on a material surface.

Referring first to FIG. 12, an illustration of a water or oil droplet 1 shows the hydrophobic and oleophobic contact angles of the droplet on a material surface 2. The degree of hydrophobicity is a relative term. Thus, material 2 can be hydrophobic and super-hydrophobic, depending on the degree of hydrophobicity. As previously mentioned, materials with surfaces with water contact angles θ greater than 90° are called "hydrophobic." While surfaces with water contact angles θ greater than 150° are called "super-hydrophobic." The degree to which water beads form on the surface of the material 2 defines whether the surface is hydrophobic or super-hydrophobic.

The actual measurement of these contact angles θ is performed by a goniometers and/or tensionmeters. A major supplier of these meters is the Ramé-hart Instrument Company, 19 Route 10 East, Suite 11 Succasunna, N.J., 07876, United States of America www.ramehart.com The most common method of measuring contact angles θ involves looking at the profile of the drop of liquid 1 and measuring two dimensionally the angle θ formed between the surface 2 and the drop of liquid.

For example, super hydrophobic paint comprises 20-40% by weight of hydrophobic nanoparticles and 60-80% by weight polymer binder. Examples of suitable hydrophobic nanoparticles particles include silica, alumina, titanium oxide, zirconium oxide, antimony oxide, zinc, oxide, tin oxide, indium oxide, cerium oxide, mullite (alumina silicate). The nanoparticles are between 5-100 nm in size and can be of a variety of shapes including spherical, elongated, asymmetric, fibrous and various combinations of these.

The paint is applied to the metal surfaces of the truck body 31 by any suitable method—e.g., spraying, dipping and painting. It can be applied to individual pieces before the truck body 31 is assembled or it can be applied after assembly. The paint can also be applied to used bodies.

Hydrophobic steel can be created by applying a 'special' hydrophobic material as a plating. In this state, the hydrophobic material is, for example, 0.020 inches thick and is very abrasion resistant, with a Mohs Number of 9 (iron is 4.5 and diamond is 10). More generally, material can be made super-hydrophobic by painting the material with a super-hydrophobic paint. When applied, the super-hydrophobic paint is, for example, 25 to 75 microns thick. Advantages of painted super-hydrophobic materials include that the paint can be applied to existing items as well as being applied to irregular shaped items.

Just as water can be repelled by hydrophobic and super-hydrophobic materials, so can oil and like petroleum products be repelled by oleophobic and super-oleophobic materials. Super-oleophobic materials are also supplied in a liquid form for painting onto a surface. In this state, the material is applied 25 to 75 microns thick. Advantages of painted super-oleophobic materials include that they can be applied to existing items and irregular shaped items are easily coated. Although the painted super-hydrophobic and super-oleophobic materials have some resistance to abrasion, they do not have the abrasion resistance of special hydrophobic treated steel material.

"Abrasion resistance" of hydrophobic and oleophobic painted materials is measured using the "Taber Abrasion Process." Results of the Taber Abrasion test are expressed by changes in percent (%) haze or in weight loss in mg per number of cycles ASTM D4060 (Weight Loss). The "Taber Wear Index" indicates 'rate of wear,' and is calculated by measuring the loss in weight (in milligrams) per thousand cycles. The lower the wear index, the better the abrasion resistance.

$$I = (A-B)*1000/C$$

where
I=wear index
A=weight of test specimen before abrasion
B=weight of test specimen after abrasion
C=number of cycles In one example, the painted super-hydrophobic and/or super-oleophobic coatings have a wear index of 0.18 and experience 5500 cycles per milligram of loss, which is illustrative of good to excellent wear resistance. While this in no way implies that painted super-hydrophobic and/or super-oleophobic surfaces are immune to wear, it does illustrate that typical painted super-hydrophobic and/or super-oleophobic materials will and do withstand moderate wear just as would many types of paints.

Thus, in using hydrophobic and oleophobic materials to minimize truck 'debris' accumulation on a truck and/or material 'carryback' in a truck body, one would pick the correct material for various parts of the truck. In general, super-hydrophobic and/or super-oleophobic material tends to be less wear resistant than material that is only hydrophobic and/or oleophobic. In alternative embodiments, the truck body can include super-hydrophobic and/or super-oleophobic materials only on the underside of the body where the need to resist wear is the least and/or the body can be supplemented with more wear-resistant hydrophobic and/or oleophobic materials in parts of the interior of the body. For example, the hydrophobic and/or oleophobic material in the interior of the body may be special hydrophobic coated steel that has high resistance to abrasion. It will be understood that in many applications the body will include only hydrophobic and/or oleophobic material on the outside surfaces of the body and that the material will be super-hydrophobic and/or super-oleophobic material. In some applications it may be advantageous to include hydrophobic and/or oleophobic material on the interior of the body to reduce carryback.

Turning to the drawings and referring first to FIG. 1, a typical off-highway truck 10 includes a cab 13, a frame 15 and a haulage body 17. The substructure of the body 17 includes a number of crossbeams 19 that provide structural integrity to the body. As generally described above, however, they create uneven surfaces that tend to collect debris during normal use of the truck 10. Muddy or otherwise adhesive ground surfaces 21 stick to the tires 23 and are flung off by the inertia of the tires' rotations, resulting in particles of the ground hitting the chassis and the underside of the body and sticking to the surfaces. The particles or "dirt" builds up over time as the truck 10 is worked. Particles in the air may also stick to the build up because of its adhesive properties. The build up may dry out virtually coating the underside surfaces of the truck with 'debris'.

Figure 2:
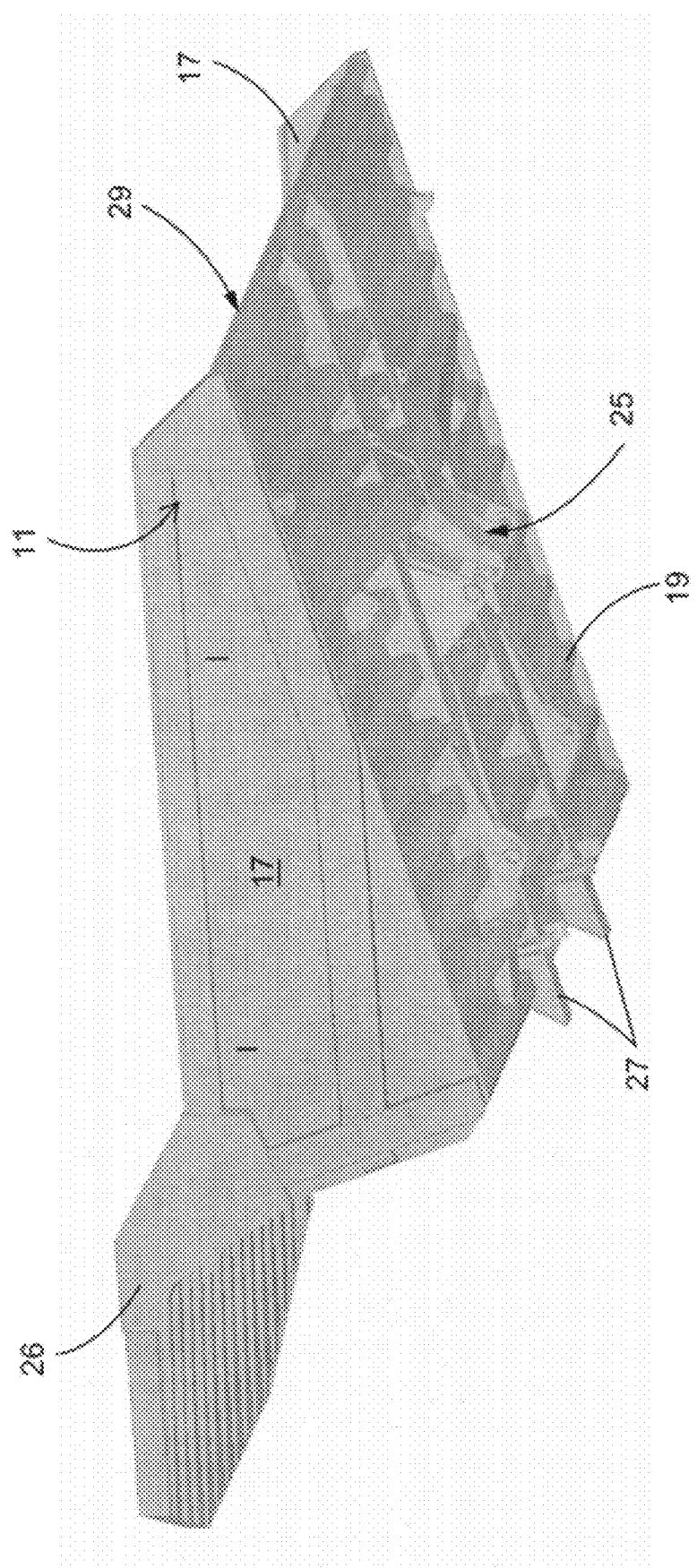
FIG. 2 is an isometric type view of the body of the off-highway truck shown in FIG. 1, showing the underside of this body and the many nooks and crannies created by the cross beams and longitudinal beams supporting the truck body floor.

FIG. 2 is an isometric type view of the body 17 of the off-highway truck 10 in FIG. 1, showing the underside 25 of the body and the many nooks and crannies created by the cross beams 19 and longitudinal beams 27 supporting the truck body floor 29.

Figure 3:
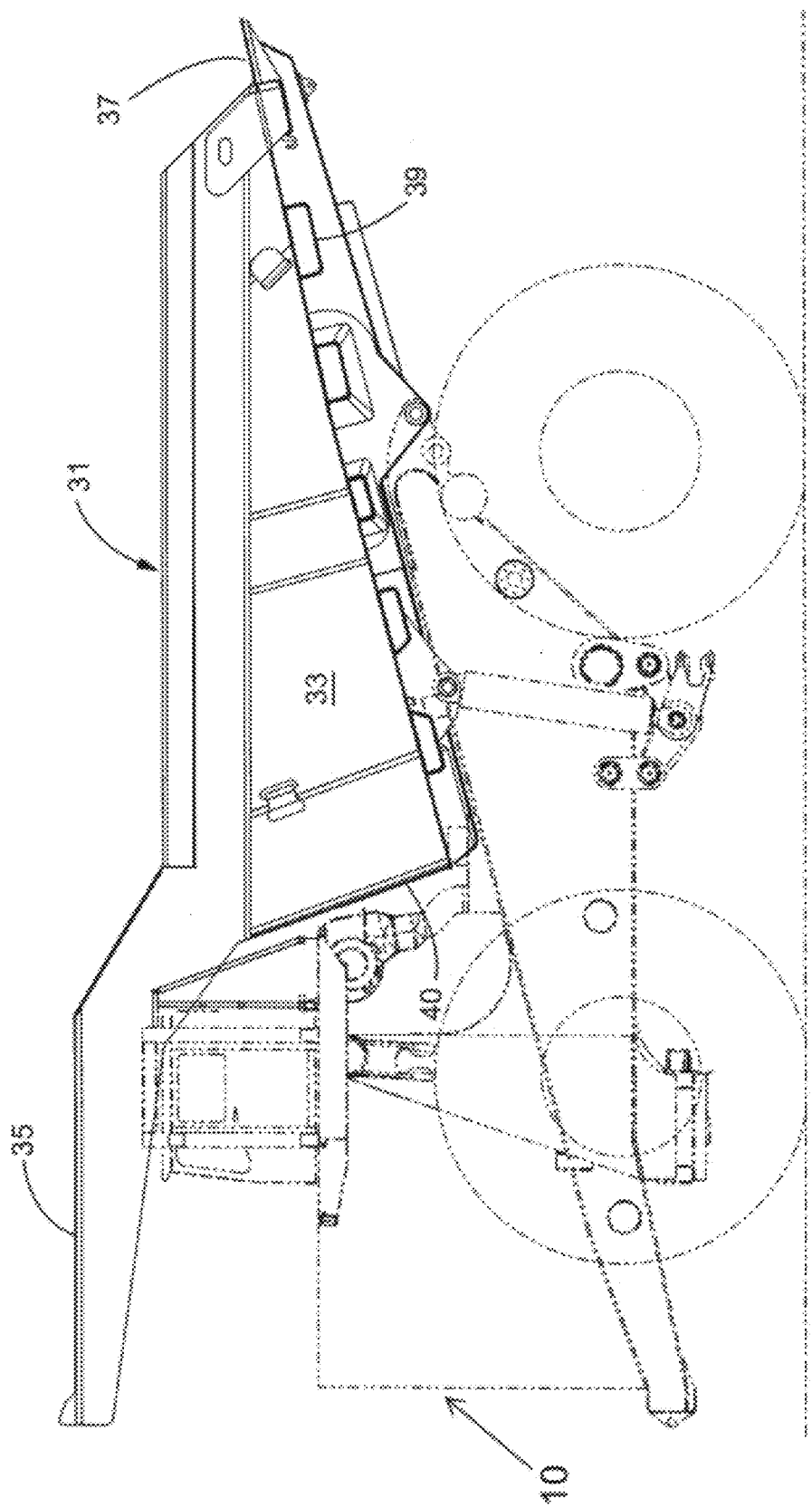
FIG. 3 is a side view of an off-highway truck and its haulage body according to an example embodiment of the invention.

FIG. 3 is a side view of an off-highway truck with a haulage body 31 constructed according to an embodiment of the invention. The construction of the body 31 is best understood by contrasting it to the body 17 in FIGS. 1 and 2. Like the body 17, the body 31 includes opposing side walls 33 (only one can be seen), a canopy 35 and a floor 37. Unlike the body 17, the body 31 includes cross members 39 on the underside of the body that are less numerous than the cross members 19 on the body 11. Yet the structural integrity of the floor 37 is not compromised because each of the cross members 39 is larger in its cross section than the cross sections of the cross members 19. By reducing the number of cross members, the underside of the body 31 has less nooks and crannies for mud and such to collect at and provide a surface for the build up of debris. The chassis and cab of the truck in FIG. 3 is the same as that illustrated in FIGS. 1 and 2.

The underside of the body 31 is coated with hydrophobic and/or oleophobic material as described hereinafter. In FIG. 3, the exterior surface of the front wall 40 of the body 31 is also coated with the material. The canopy 35 is also coated. To illustrate the coating, the lines for the coated surfaces are relatively thicker than the other lines in the figure.

Figure 4:
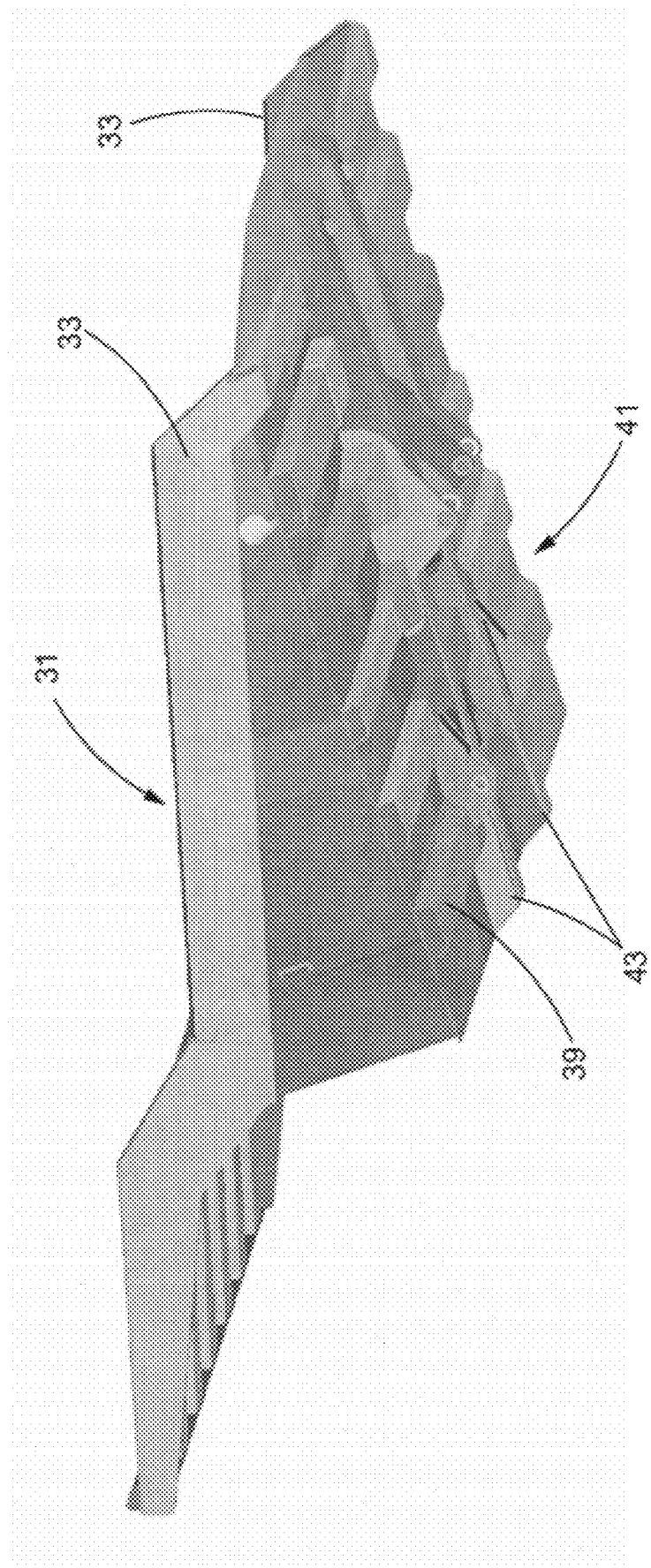
FIG. 4 is an isometric type view of the haulage body of FIG. 3, showing the underside of the body and its much simpler construction that results in significantly less nooks and crannies.

FIG. 4 is an isometric-type view of the haulage body of FIG. 3, showing the underside 41 of the body 31 and its much simpler construction that results in significantly less nooks and crannies. Like the body 11, the body 31 includes longitudinal beams 43. But the cross members 39 are larger in cross section and less in number, in the illustrated embodiment of the body 31, there are six (6) cross members 39 compared to the ten (10) cross members 19 in the body 11.

FIG. 5 is a side view of the off-highway truck body 11 of FIGS. 1 and 2 showing where major 'debris' can be expected to buildup on the truck body. The debris is illustrated as the solid black areas 45 on the underside 25 of the body 11 and 47 on the canopy 26. Of course, there would be lesser buildup on other parts of the truck body 11 and chassis 15 not shown in the figure. FIGS. 5A and 5B are isolated views of the major debris 45 and 47 illustrated in FIG. 5, where FIG. 5A is the debris buildup on the canopy 26 of the haulage body in FIG. 5 and FIG. 5B is the debris buildup on the underside 25 of the body 11 in FIG. 5.

Figure 6:
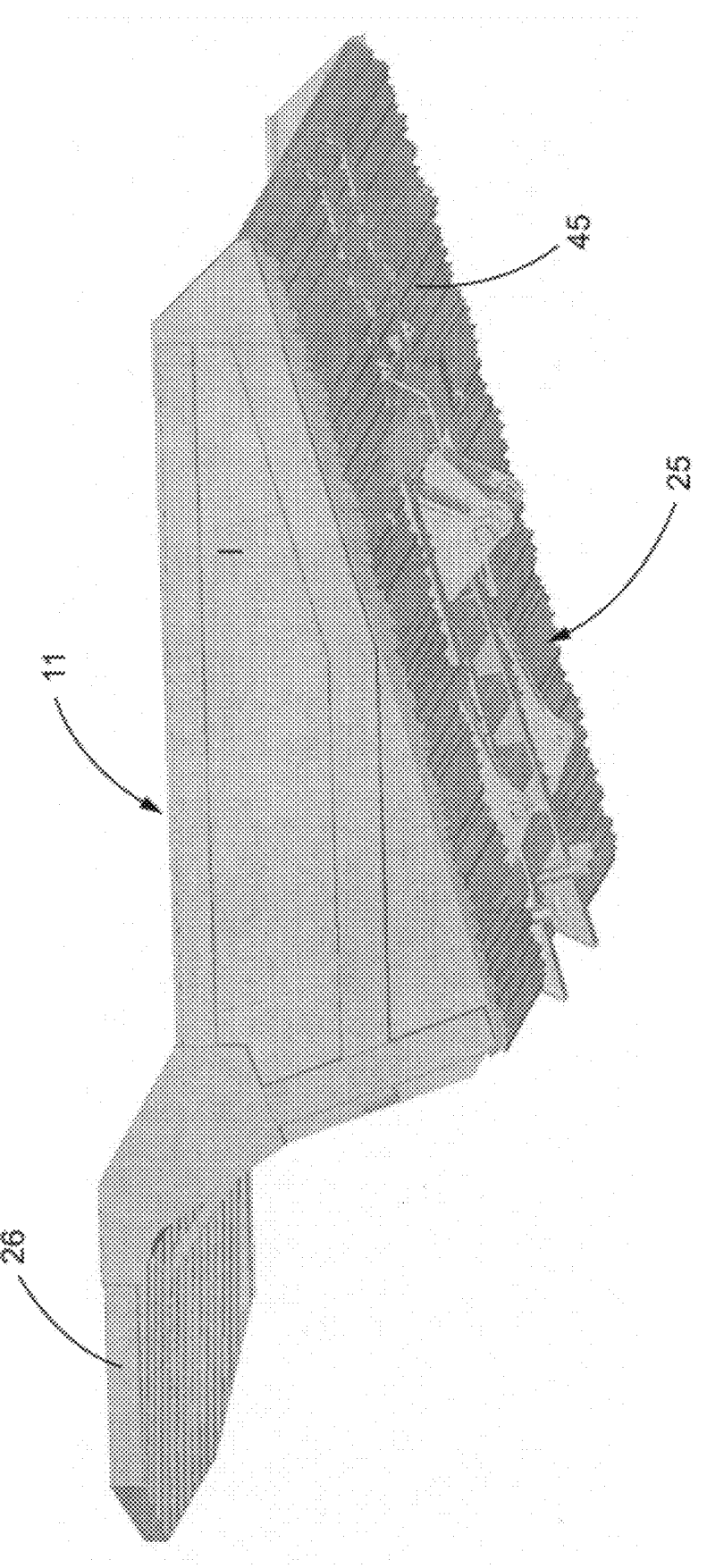
FIG. 6 is an isometric type view of the body from FIG. 5 illustrating the distribution of the 'debris' buildup on the underside of the haulage body.
Figure 7:
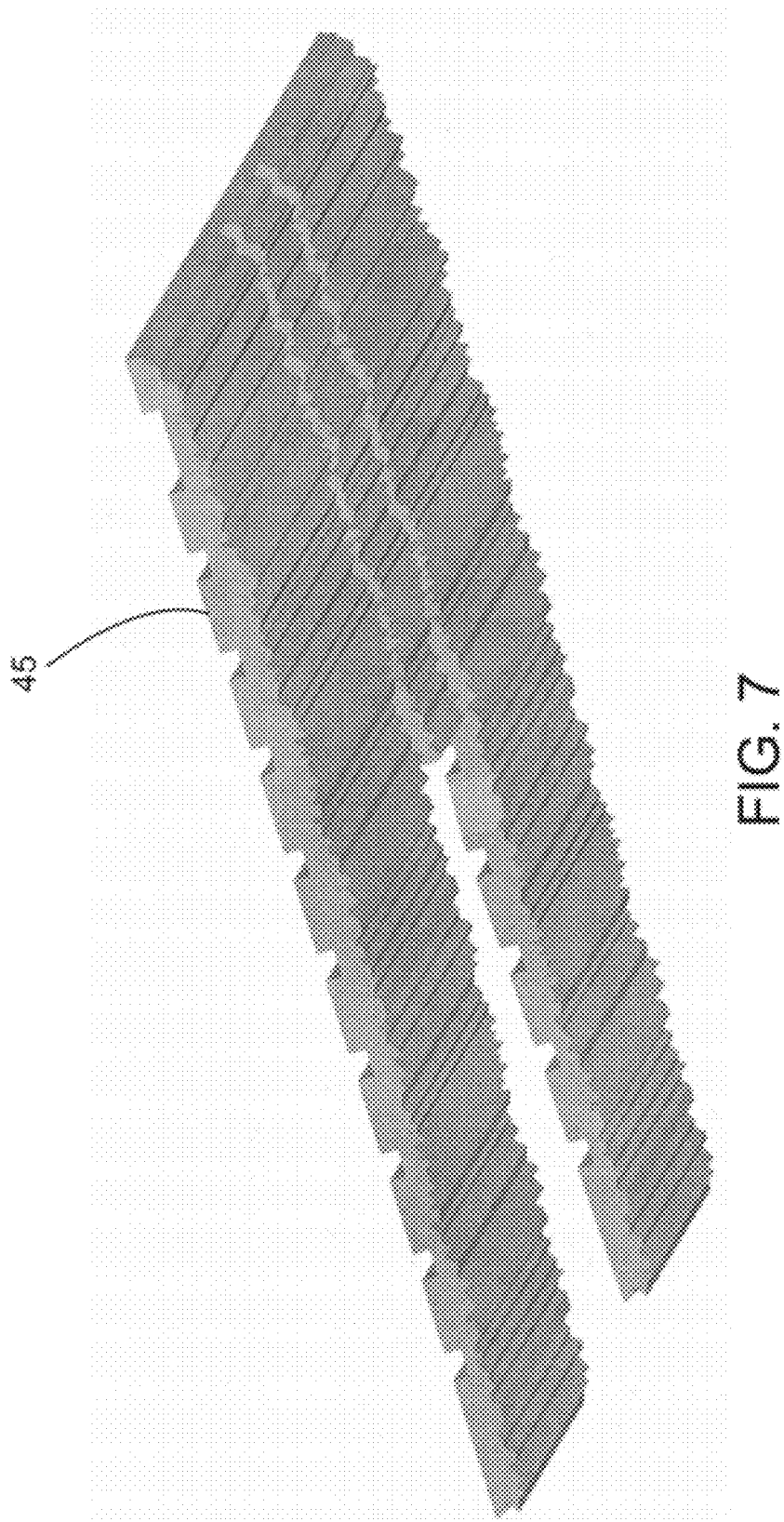
FIG. 7 is the isometric view of FIG. 6 isolating just the underside 'debris' buildup.

FIG. 6 is an isometric type view of the body 11 from FIG. 5, illustrating the distribution of the 'debris' buildup 45 on the underside 25 of the haulage body. FIG. 7 is the isometric view of FIG. 6 isolating just the 'debris' buildup. As the illustration suggests, the buildup of material can be substantial.

Figure 8:
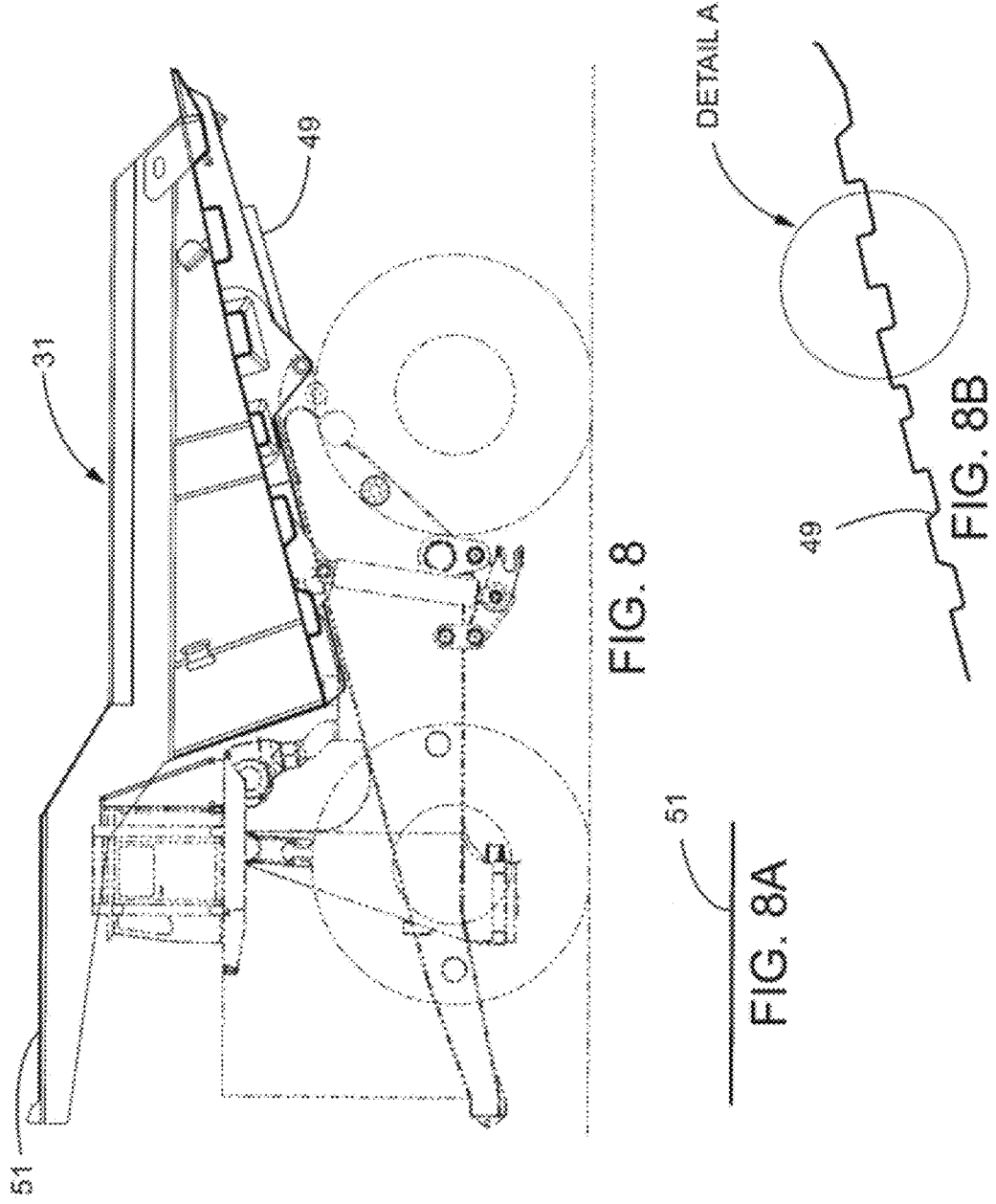
FIG. 8 is a side view of the off-highway truck of FIG. 3 indicating in thickened lines some of the areas where hydrophobic and/or oleophohic materials would be applied to a typical off-highway truck body in accordance with an embodiment of the invention.

FIG. 8 is a side view of the off-highway truck of FIG. 3 indicating in thickened lines 49, and 51 some of the external areas of the body 31 where hydrophobic and/or oleophobic materials would be applied to a typical off-highway truck body in an example embodiment of the invention.

FIGS. 8A and 8B illustrate the two areas 49 and 51 from FIG. 8 that include hydrophobic and/or oleophobic materials, where FIG. 8A is a coating of material for the canopy of the haulage body and FIG. 8B is material for the underside of the body. An example of an appropriate material is a paint manufactured by Ross Technology Corporation of Leola, Pa. The paint is described in detail in Published US Patent Application No. 2010/0314575 entitled "Anti-icing Superhydrophobic Coating," which is incorporated by reference herein for everything that it describes.

Figure 9:
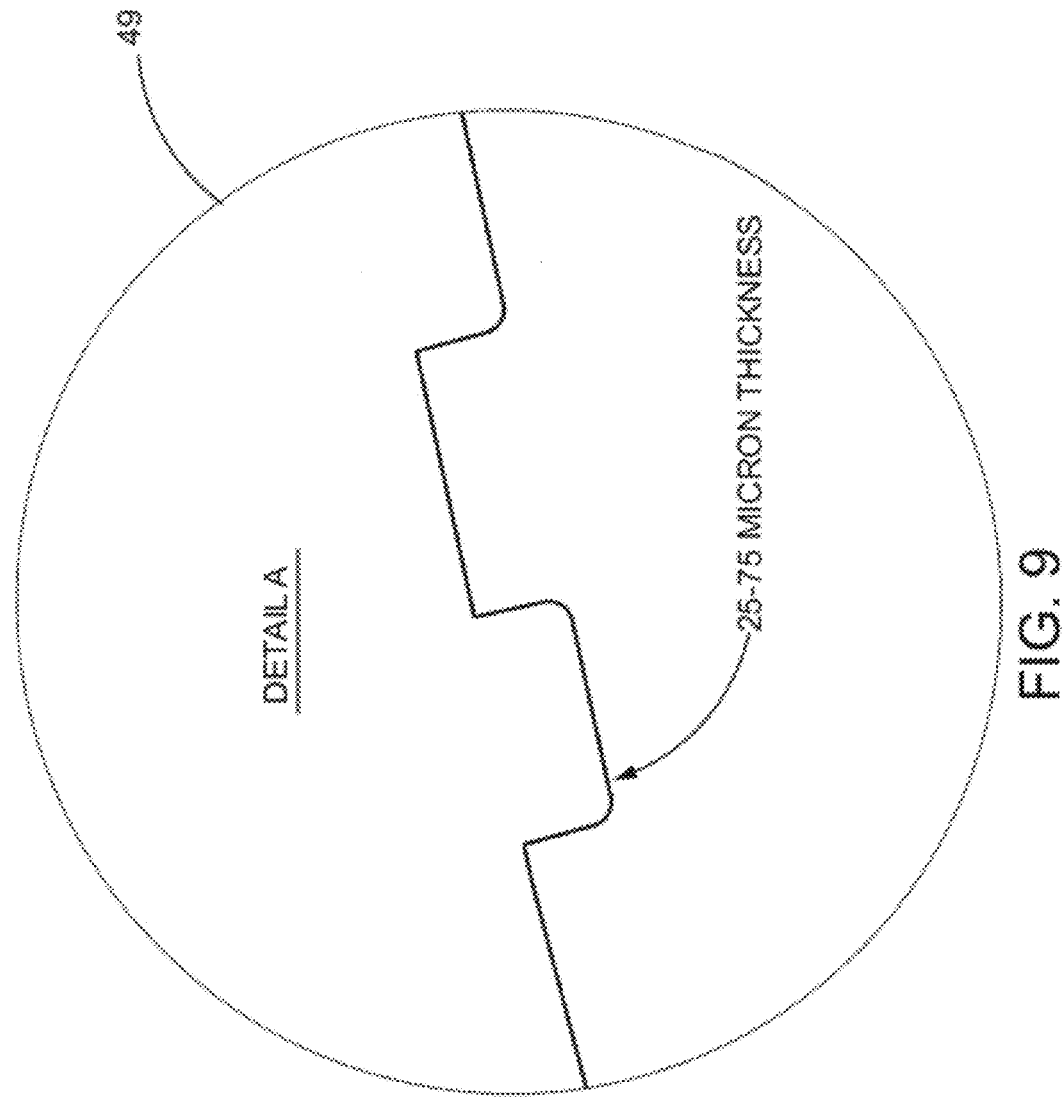
FIG. 9 illustrates 'Detail A' of FIG. 8B, indicating that the hydrophobic and/or oleophobic materials is applied to a typical thickness of 25 to 75 microns.

FIG. 9 illustrates 'Detail A' of the coating 49 in FIG. 8B, indicating that the hydrophobic and/or oleophobic materials is applied to a typical thickness of about 25 to 75 microns.

Figure 10:
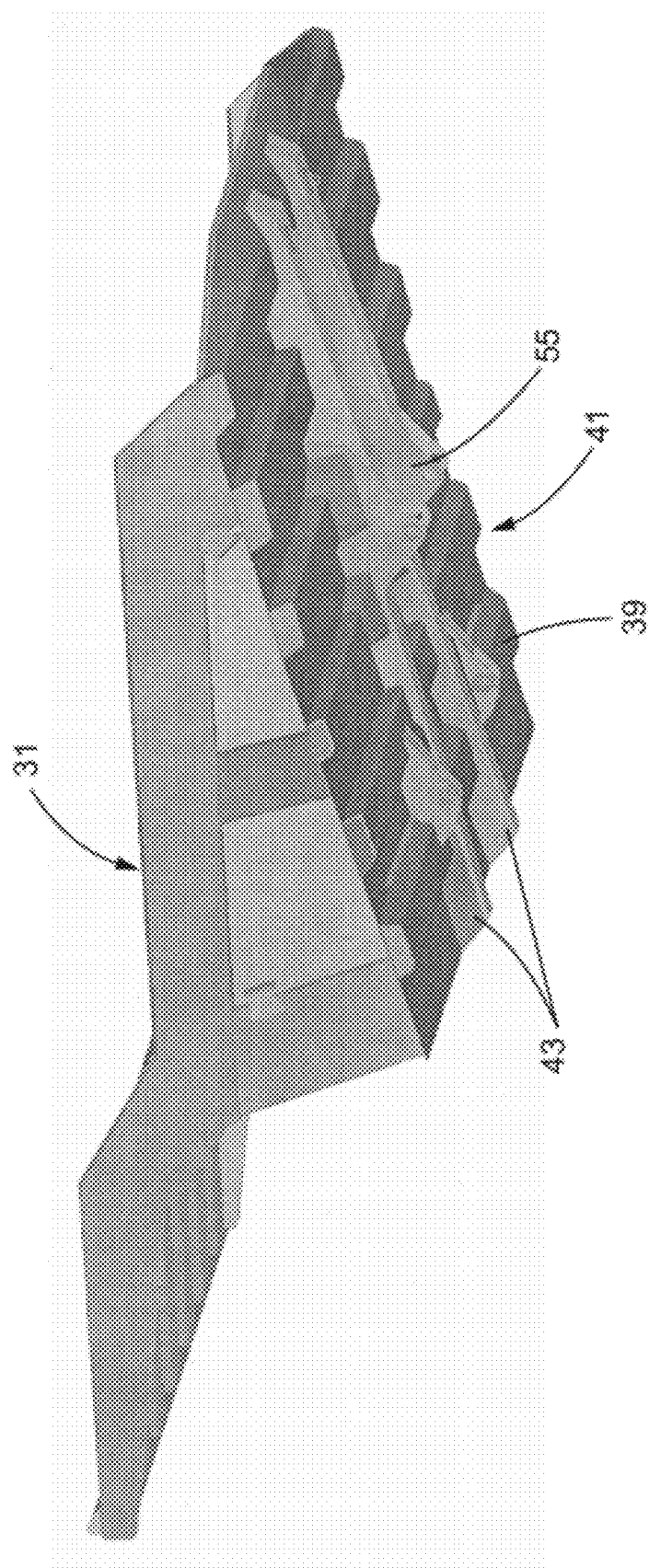
FIG. 10 is an isometric view of the body of FIG. 8, illustrating in a consistently darker shade where hydrophobic and/or oleophobic materials is preferably applied to the underside of the haulage body.
Figure 11:
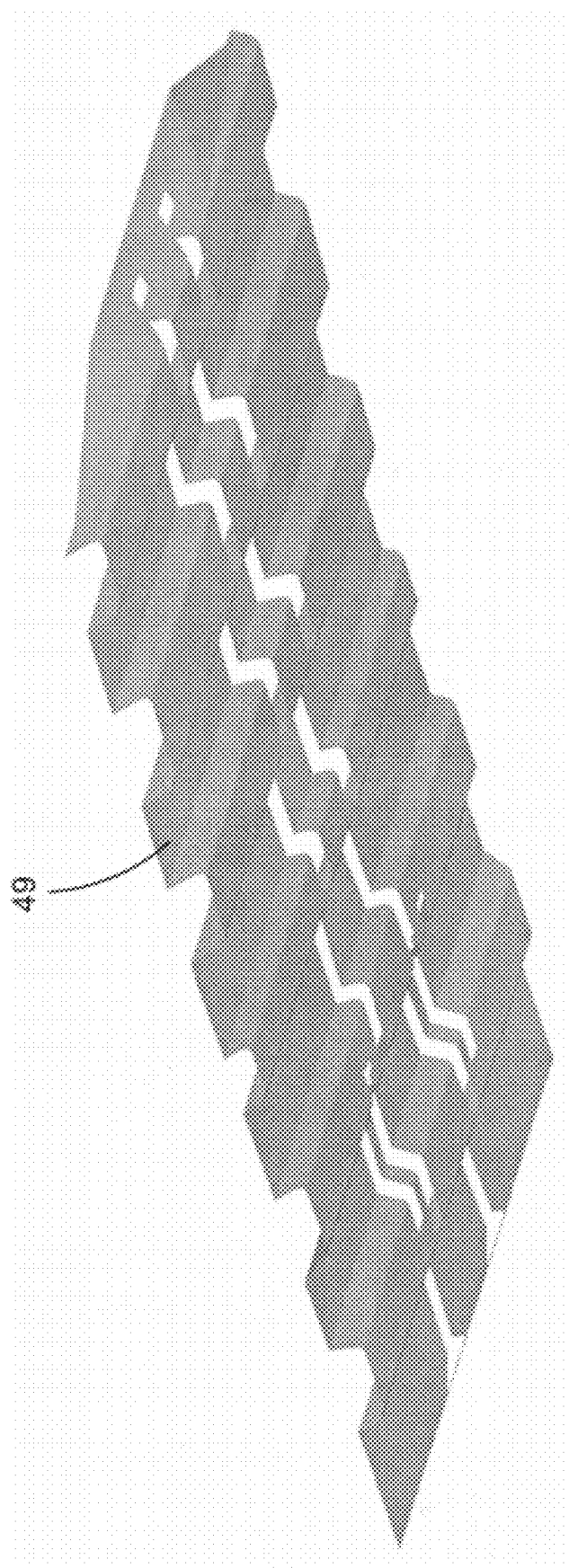
FIG. 11 is the isometric view of FIG. 10, isolating just the hydrophobic and/or oleophobic coating materials applied to the body of FIG. 10.

FIG. 10 is an isometric view of the body 31 of FIG. 8 illustrating in a consistently darker shade where hydrophobic and/or oleophobic material is applied to the underside 41 of the haulage body in an example embodiment. Specifically, the coating is applied to the underside of the floor 37 and to the cross members 39, but not to the longitudinal beams 43 and the hinges 55. FIG. 11 is the isometric view of FIG. 10 isolating just the hydrophobic and/or oleophobic coating material 49 applied to the body 31 of FIG. 10.

In an alternative embodiment, the super-hydrophobic and/or super-oleophobic material coating on the underside 41 of the body 31 is complemented by hydrophobic and/or oleophobic material in the interior of the body. The embodiment enhances the ability of the body 31 to shed debris and maximizes the body's potential to approach 100% of its Achievable Payload.

Figure 13:
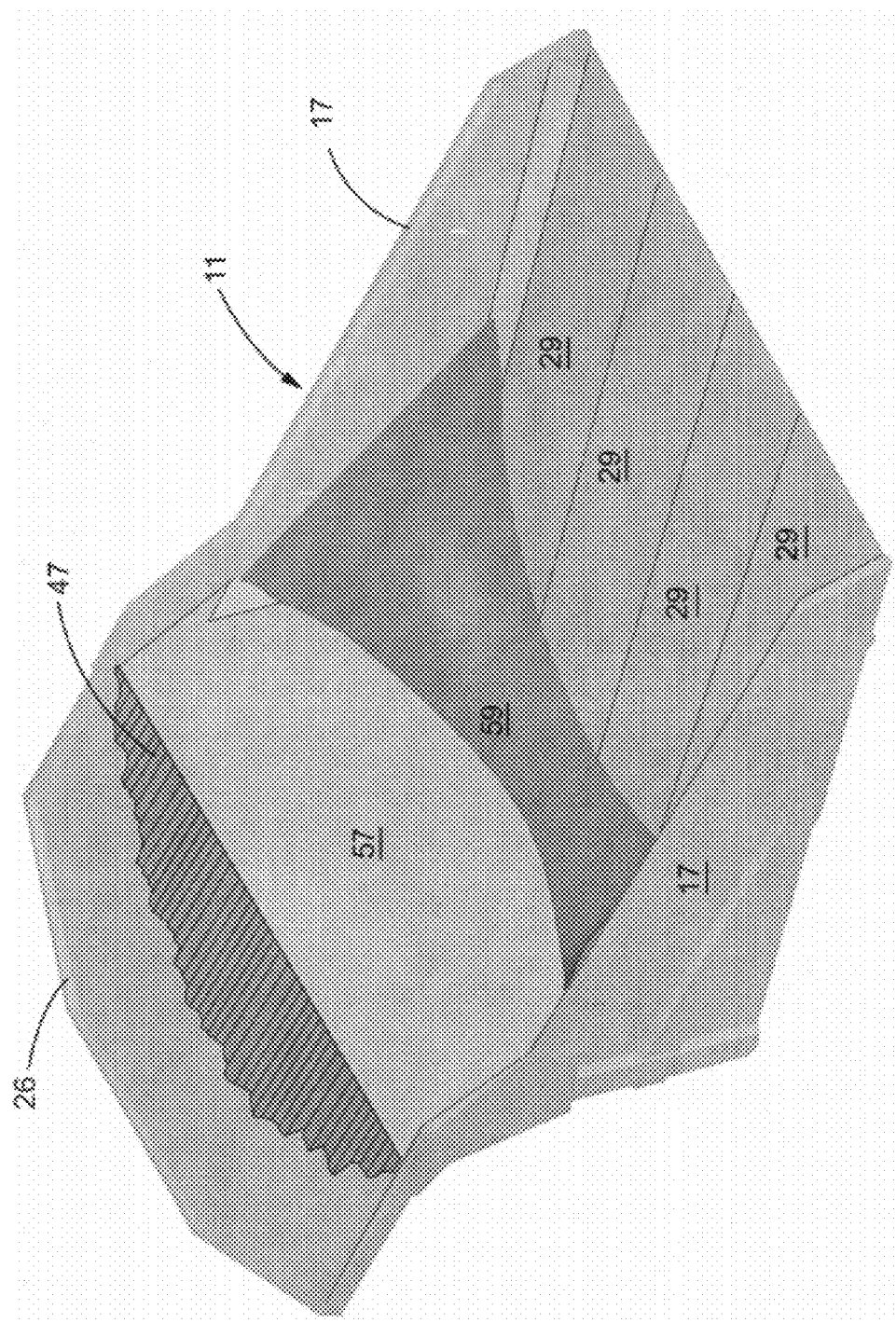
FIG. 13 illustrates where 'debris' could be expected to buildup on the canopy and on the inside of an off-highway truck body.

Without the addition of hydrophobic and/or oleophobic material to the interior of the body 31 in FIG. 13 could be expected to build up debris 47 on the canopy 26 of the body 11 and on the inside of the body at the junctions of the front wall 57, floor 29 and side walls 17. The build up at the junctions is shown as debris 59 in FIG. 13.

Figure 14:
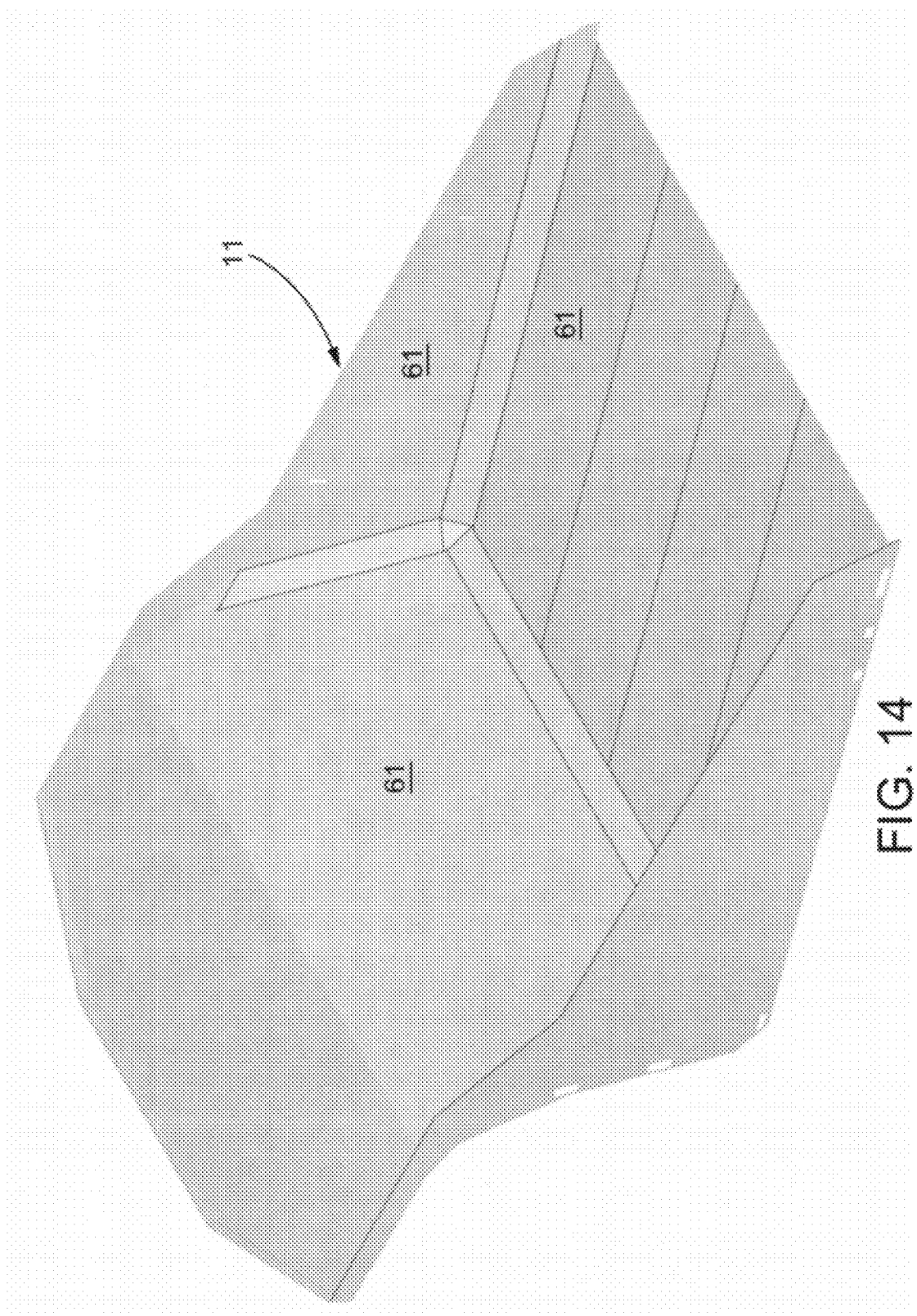
FIG. 14 illustrates the truck body of FIG. 13 with some structure removed to clearly show load containment plates of the truck body, which actually contact the load.

FIG. 14 illustrates the truck body 11 of FIG. 13 with some structure removed to better show the load containment plates 61 (i.e., the plates that actually contact the load) of the truck body 11. To reduce or eliminate the buildup of the debris 47 and 59 in FIG. 13, some of the plates 61 can be supplied as hydrophobic treated plates, hydrophobic coated plates, or they can be a base to which hydrophobic clad plates are attached and/or oleophobic type coatings/materials applied. An example of an hydrophobic plate of sufficient hardness for the interior spaces of the body 11 is a Crodon® wear plate manufactured Chromium Corporation, 14643 Dallas Parkway, Dallas, Tex. 75254, United States of America.

Figure 15:
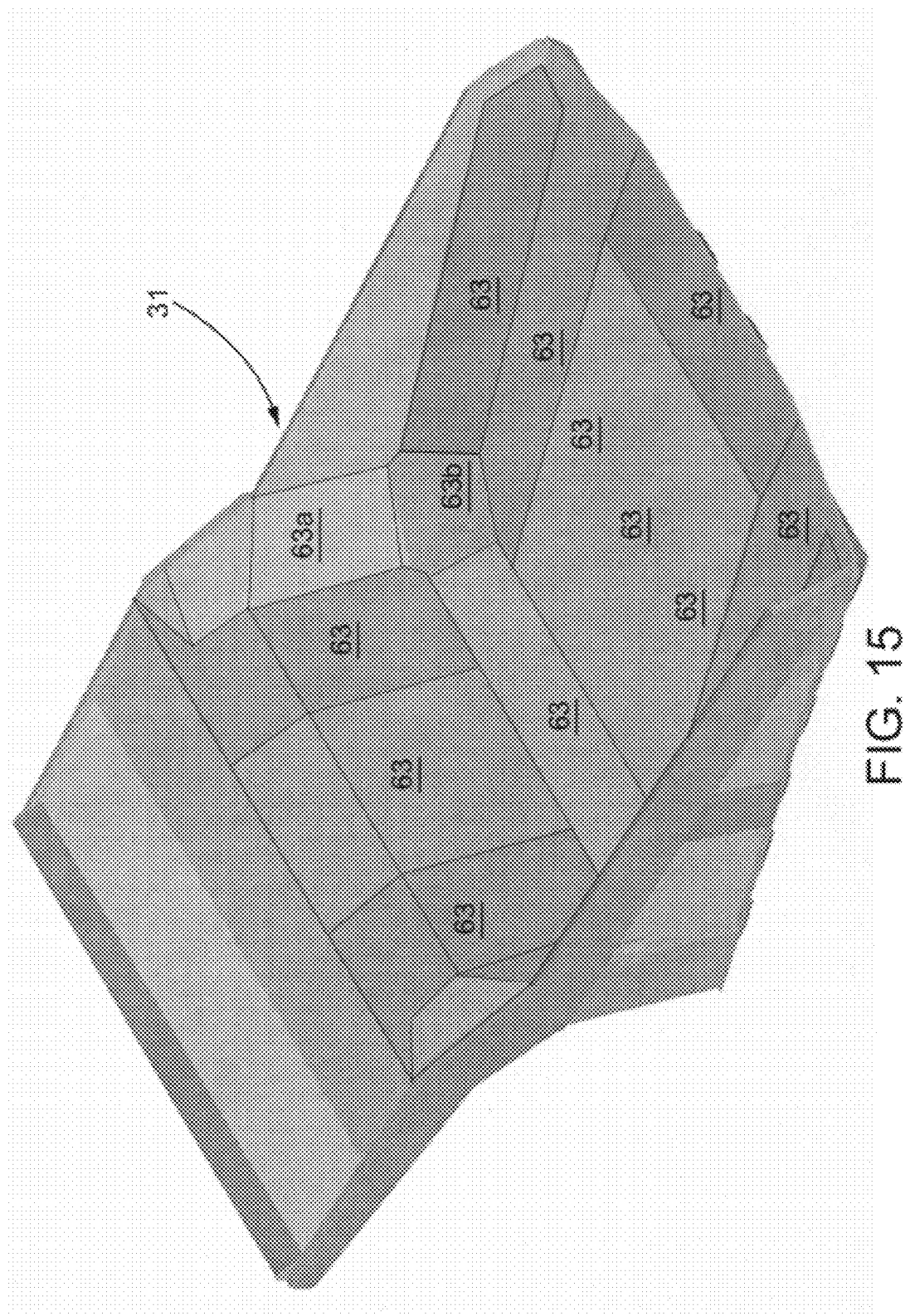
FIG. 15 is an illustration of the an embodiment of a truck body which offers the option of selectively placing, on selected truck body planes, hydrophobic treated plates, hydrophobic coated plates, or hydrophobic clad plates applied to the inside of the off-highway truck body of FIG. 3.

FIG. 15 illustrates the another example of an embodiment of the interior of the truck body 31 that offers the option of selectively placing, on individual truck body planes 63, hydrophobic treated plates, hydrophobic coated plates, or hydrophobic clad plates applied to the inside of the off-highway truck body 31 of FIG. 3. In the body 31 of FIG. 3, treated plates are placed only in the corners formed by the junctions of the body sidewalls 33 and the body front wall 40. Of course, because FIG. 3 pictures the truck from the side, the interior of the body 31 is not visible. Using FIG. 15, the treated plates may be at the planes 63 marked "a" and "b" in the one visible corner. The other corner in FIG. 15 that is not completely visible would be similarly constructed with treated plates.

Figure 16:
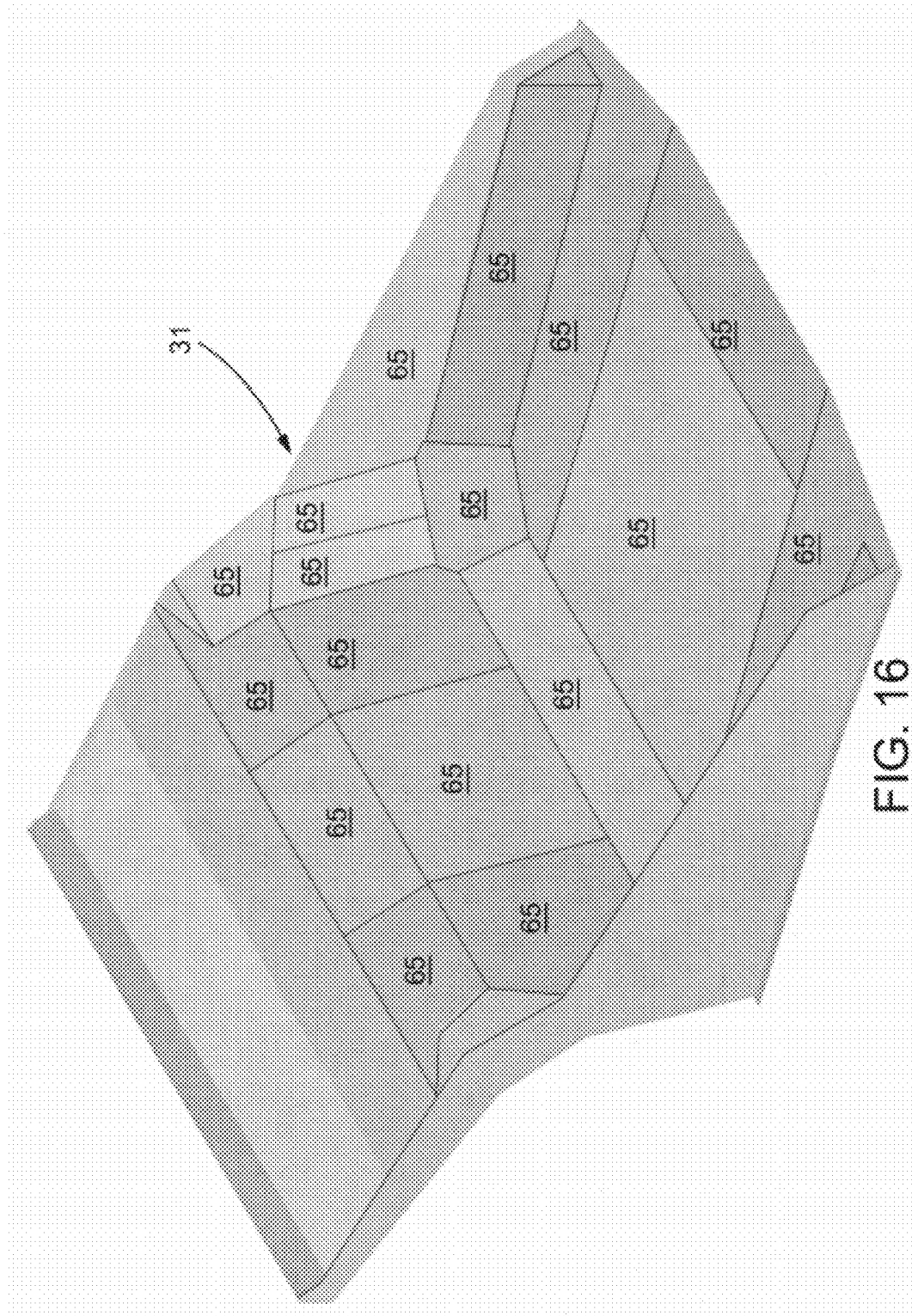
FIG. 16 illustrates the truck body of FIG. 15 with some structure removed to clearly show load containment plates of the truck body, which actually contact the load.

FIG. 16 illustrates the truck body 31 of FIG. 15 with some structure removed to better show the load containment plates 65 (i.e., the plates that actually contact the load) of the truck body. These plates 65 can be supplied as hydrophobic treated plates, hydrophobic coated plates, or they can be a base to which hydrophobic clad plates are attached and/or oleophobic type coatings/materials applied.

Figure 17:
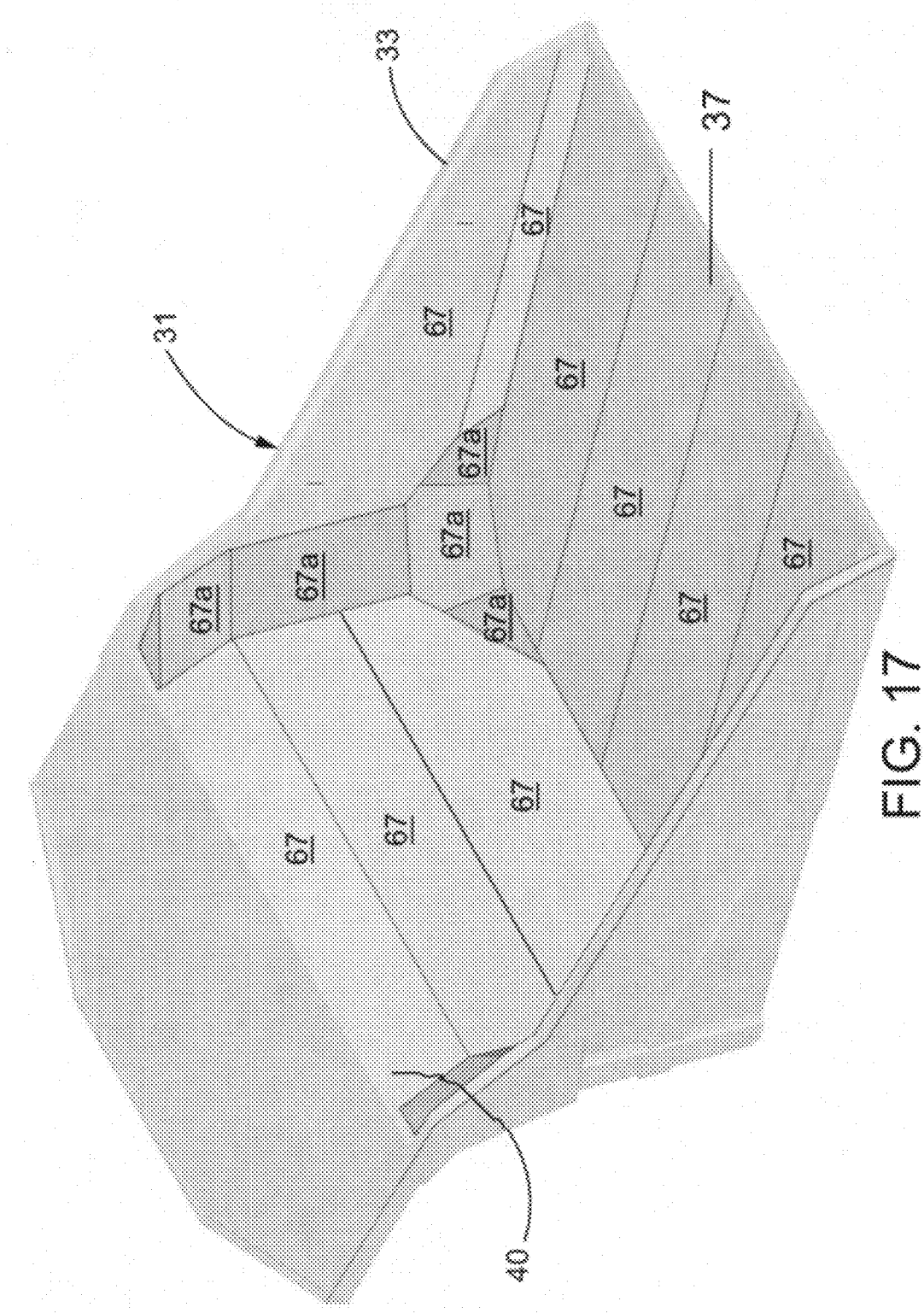
FIG. 17 illustrates the truck body of FIG. 3 with the option of selectively placing, on selected truck body planes, hydrophobic treated plates, hydrophobic coated plates, or hydrophobic clad plates applied to the inside of the truck body.

FIG. 17 is the truck body 31 of FIG. 3, illustrating a still further embodiment of the interior plates that offers the option of selectively placing, on selected truck body planes 67, hydrophobic treated plates, hydrophobic coated plates, or hydrophobic clad plates applied to the inside of the truck body. In this embodiment, the treated plates are placed in the corners between the body sidewalls 33 and the body front wall 40 and additionally outward from these corners both slightly across the front of the body between the body floor 37 and the body front wall 40 as well as extending slightly rearward. Referring to FIG. 17, the treated palates are at the planes marked as "a" in the visible corner of the body 31. The construction is the same in the corner not completely visible.

Figure 18:
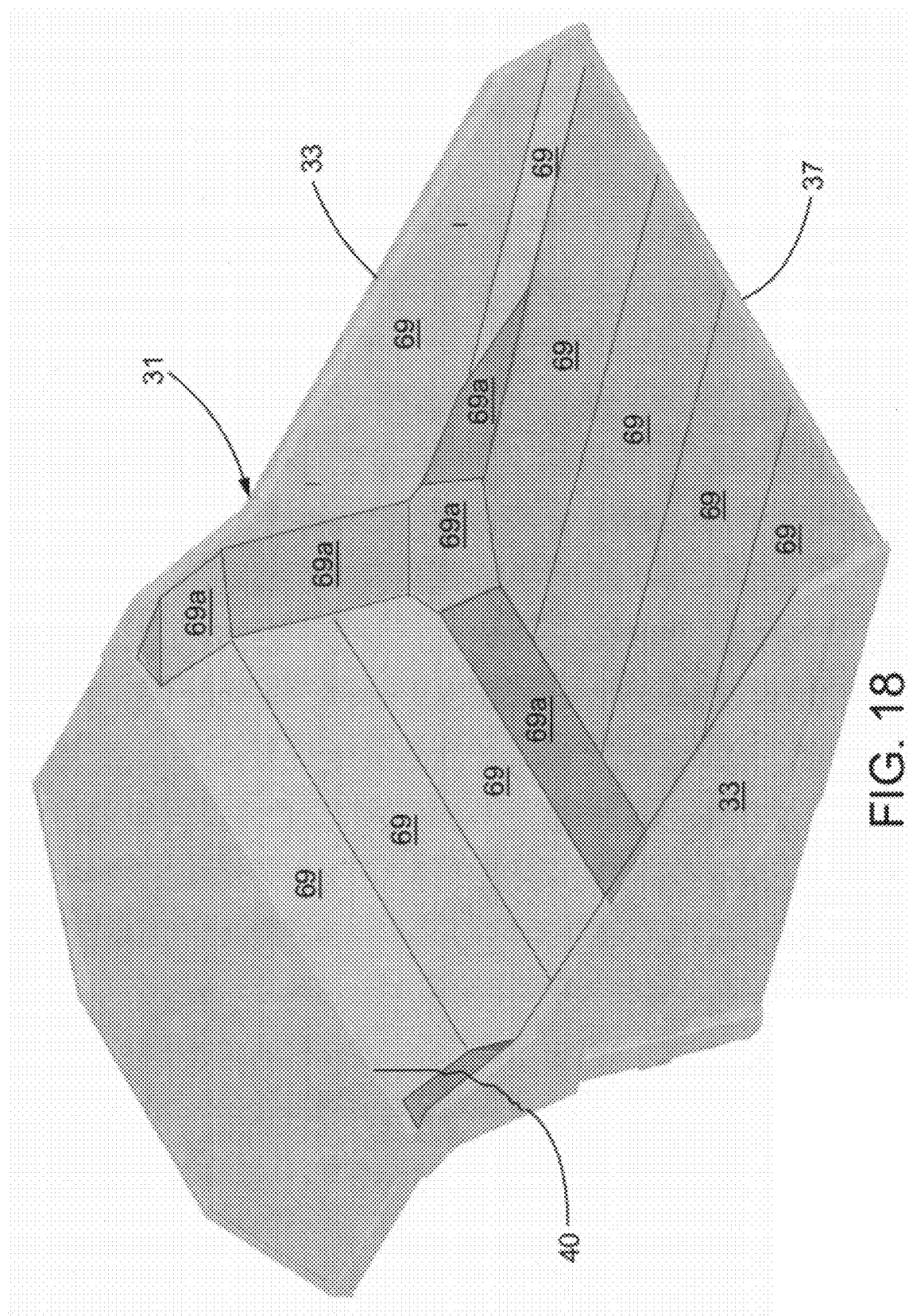
FIG. 18 is the truck body of FIG. 3, illustrating another option of selectively placing, on selected truck body planes, hydrophobic treated plates, hydrophobic coated plates, or hydrophobic clad plates to the inside of the off-highway truck body.

FIG. 18 is the truck body 31 of FIG. 3, illustrating another embodiment of the interior of the body that offers the option of selectively placing, on selected truck body planes 69, hydrophobic treated plates, hydrophobic coated plates, or hydrophobic clad plates to the inside of the off-highway truck body. In this illustrated embodiment, the treated plates "a" are placed in the corners between the body sidewalk 33 and the body front wall 40 and additionally across the front of the body 31 between the body floor 37 and the body front wall 40 as well as extending significantly rearward along the body floor, between the body floor and the body sides.

Figure 19:
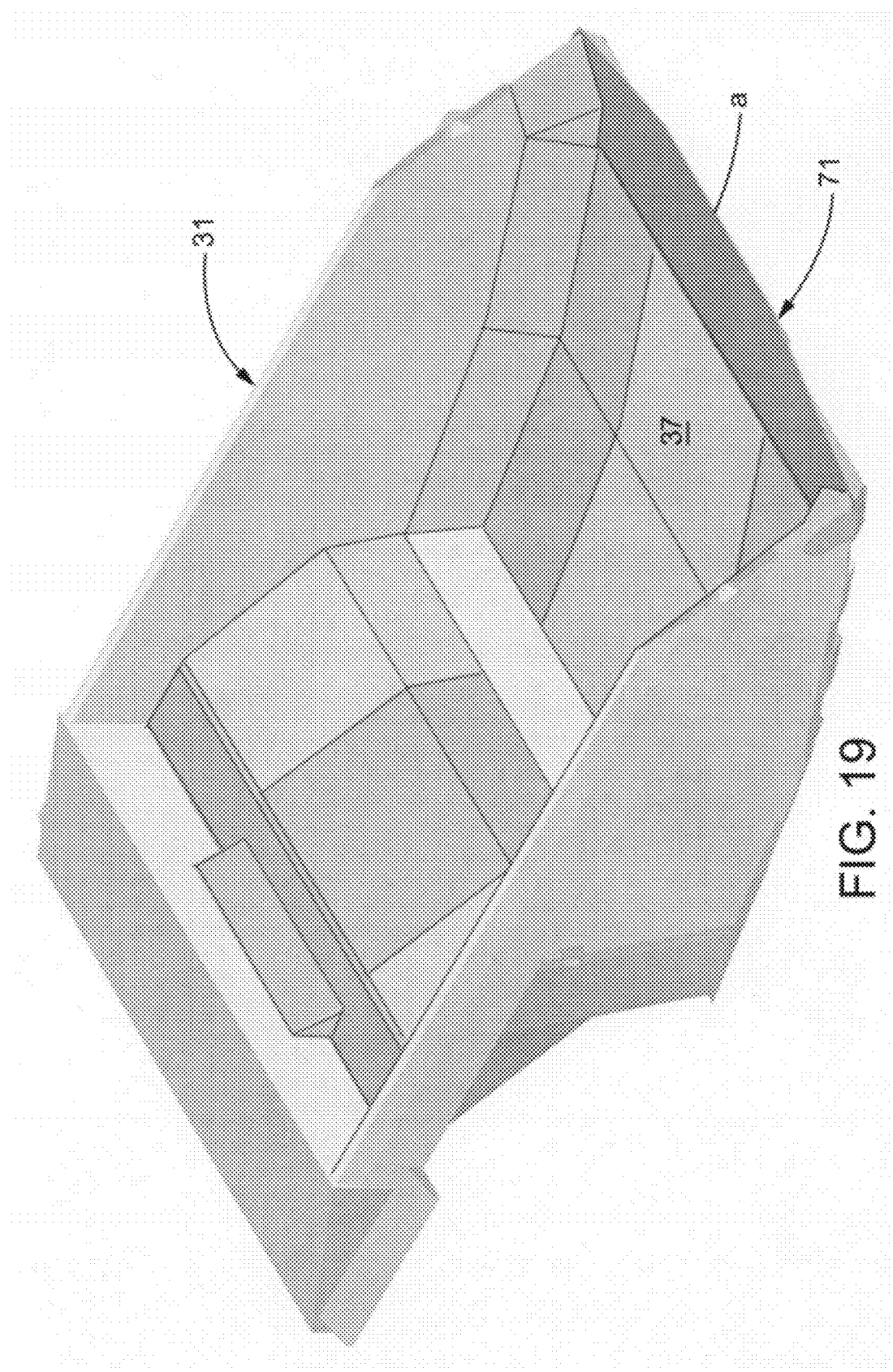
FIG. 19 is the truck body of FIG. 3, illustrating still another embodiment of the truck body with hydrophobic treated plates, hydrophobic coated plates, or hydrophobic clad plates applied on the rear of the body floor of the off-highway truck body.

FIG. 19 is the truck body 31 of FIG. 3, illustrating still another embodiment of the interior of the body with hydrophobic treated plates, hydrophobic coated plates, or hydrophobic clad plates applied on the rear of the body floor of the off-highway truck body. In this embodiment, the treated plates "a" are placed at the rear 71 of the body 31 to eliminate 'debris' buildup at the rear of the body as material is dumped across the rear tail chute of the body. In an alternative embodiment, the rear most section of the floor 37 is tipped up more dramatically than illustrated to insure good hauling load retention particularly in lighter density material haulage where a higher volume body than normal is required. This extreme rear floor tip up can have a tendency to create some problems in material being dumping from the body because in its dump position the rear section of floor 37 may not be sufficiently rotated/tilted to reliably provide good material flow over normal body floor plate steel. Thus, hydrophobic and oleophobic materials with their moisture repelling, lower coefficients of friction characteristics applied in this area will minimize any problems with material flow out the rear of such a body.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Example embodiments of the invention are described herein. Variations of these example embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A truck body comprising:
   a floor, opposing side walls and, a front wall that form an interior of the truck body; and
   an underside including cross members and longitudinal members supporting the floor, a coating of super-hydrophobic material being disposed on at least a portion of the underside of the truck body so as to prevent road debris from collecting on the underside of the truck body, and a hydrophobic plated material being disposed on at least a portion of an interior surface of the truck body so as to prevent a hauled material from collecting on the interior of the truck body.

2. The truck body of claim 1 wherein the coating includes nanoparticles.

3. The truck body of claim 1 wherein the coating has a wear index of 0.2 or less.

4. The truck body of claim 1 wherein the longitudinal members are only selectively covered by super-hydrophobic material.

5. The truck body of claim 1 wherein the coating is both super-hydrophobic and super-oleophobic.

6. The truck body of claim 1 wherein the interior of the truck body includes corners comprising the hydrophobic plated material.

7. The truck body of claim 6 including a canopy extending from the front wall and including the hydrophobic material on at least part of the canopy.

8. A truck body comprising:
 a floor, opposing side walls and a front wall that form an interior of the truck body; and
 an underside including cross members and longitudinal members supporting the floor, a coating of super-oleophobic material being disposed on at least a portion of the underside of the truck body so as to prevent road debris from collecting on the underside of the truck body, and a hydrophobic plated material being disposed on at least a portion of an interior surface of the truck body so as to prevent a hauled material from collecting on the interior of the truck body.

9. The truck body of claim 8 wherein the coating includes nanoparticles.

10. The truck body of claim 8 wherein the coating has a wear index of 0.2 or less.

11. The truck body of claim 8 wherein at least a portion of the longitudinal members is not covered by super-hydrophobic material.

12. A method of making a truck body resistant to a build up of unwanted material that reduces a load capacity of the body, the method comprising:
 coating at least a portion of an underside of the truck body with super-hydrophobic material so as to prevent a build up of road debris on the underside of the truck body; and
 constructing an interior space of the truck body to include hydrophobic plated material on at least a portion of the interior space so as to prevent a build up of hauled material on the interior space of the truck body, the hydrophobic plated material having an abrasion resistance that is substantially higher than the abrasion resistance of the coating of super-hydrophobic material on the underside of the truck body.

13. The method of claim 12 including painting the underside of the truck body to create the coating.

* * * * *